No. 833,429. PATENTED OCT. 16, 1906.
A. VAN WAGENEN.
AUTOMATIC SYSTEM OF INTERCOMMUNICATION.
APPLICATION FILED JULY 31, 1902. RENEWED MAR. 3, 1906.
8 SHEETS—SHEET 2.
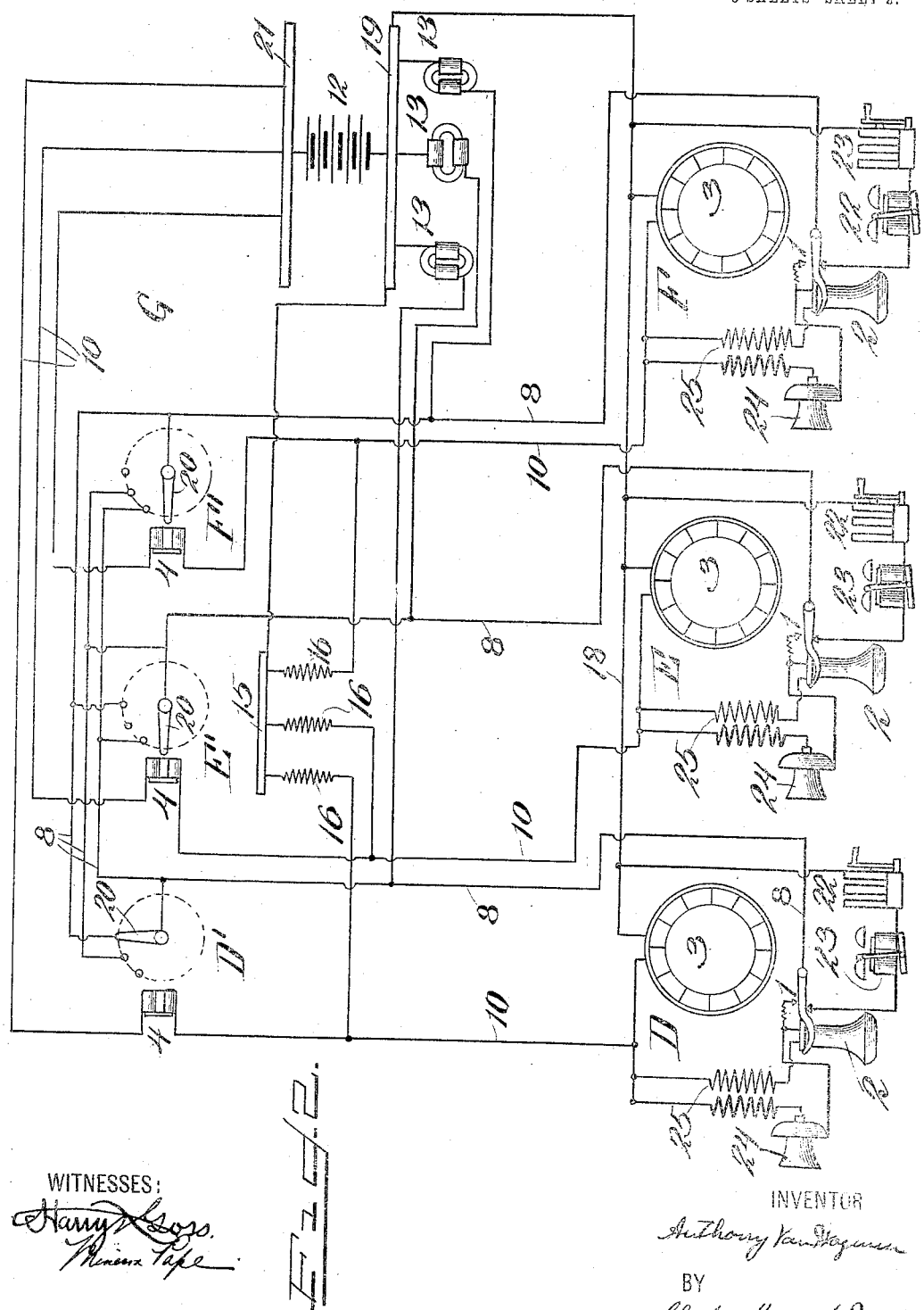
WITNESSES:
INVENTOR
Anthony Van Wagenen
BY
Chapin Haywood Marble
ATTORNEYS No. 833,429. PATENTED OCT. 16, 1906.
A. VAN WAGENEN.
AUTOMATIC SYSTEM OF INTERCOMMUNICATION.
APPLICATION FILED JULY 31, 1902. RENEWED MAR. 3, 1906.
8 SHEETS—SHEET 3.
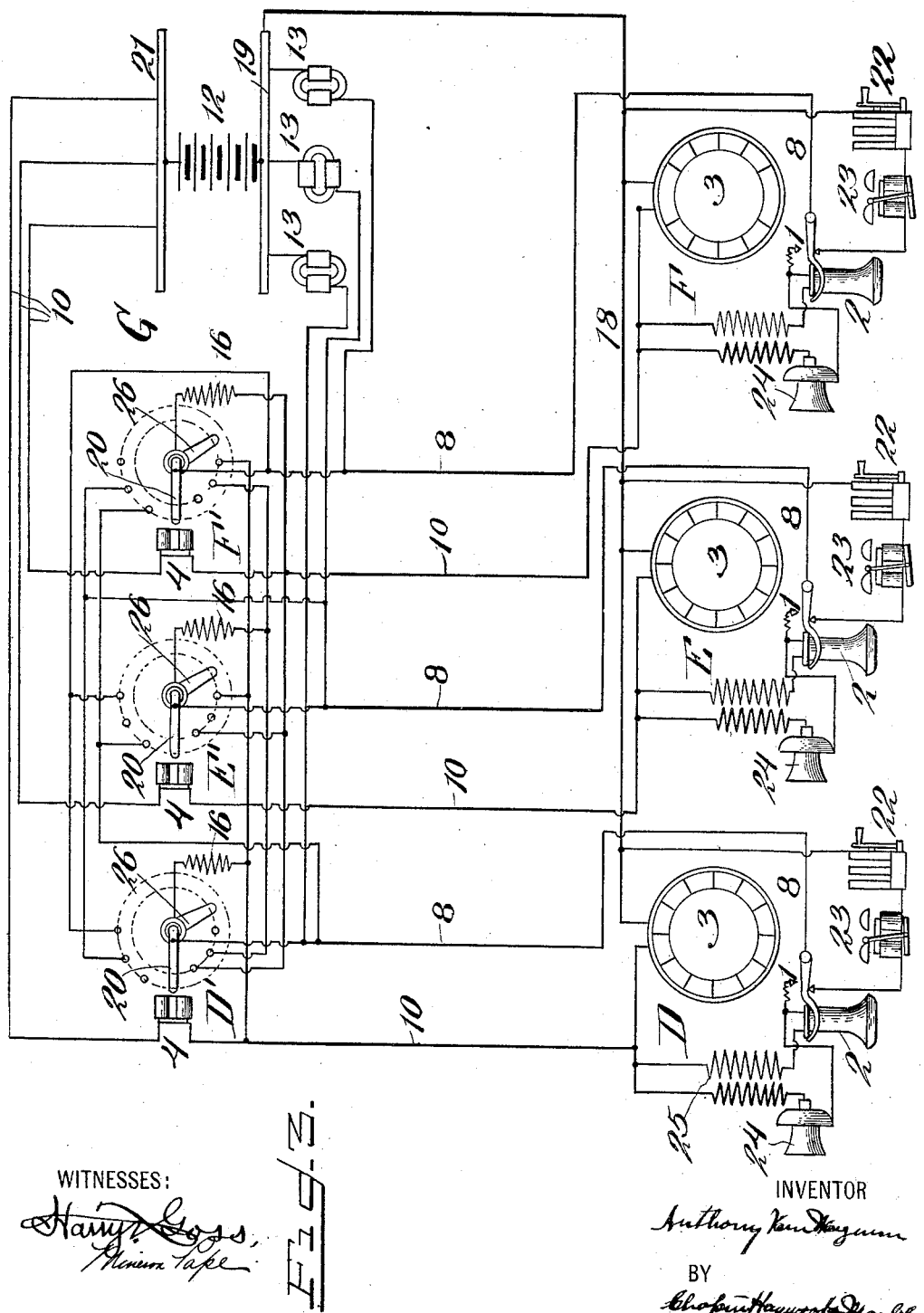
WITNESSES:
INVENTOR
BY
ATTORNEYS No. 833,429. PATENTED OCT. 16, 1906.
A. VAN WAGENEN.
AUTOMATIC SYSTEM OF INTERCOMMUNICATION.
APPLICATION FILED JULY 31, 1902. RENEWED MAR. 3, 1906.
8 SHEETS—SHEET 4.
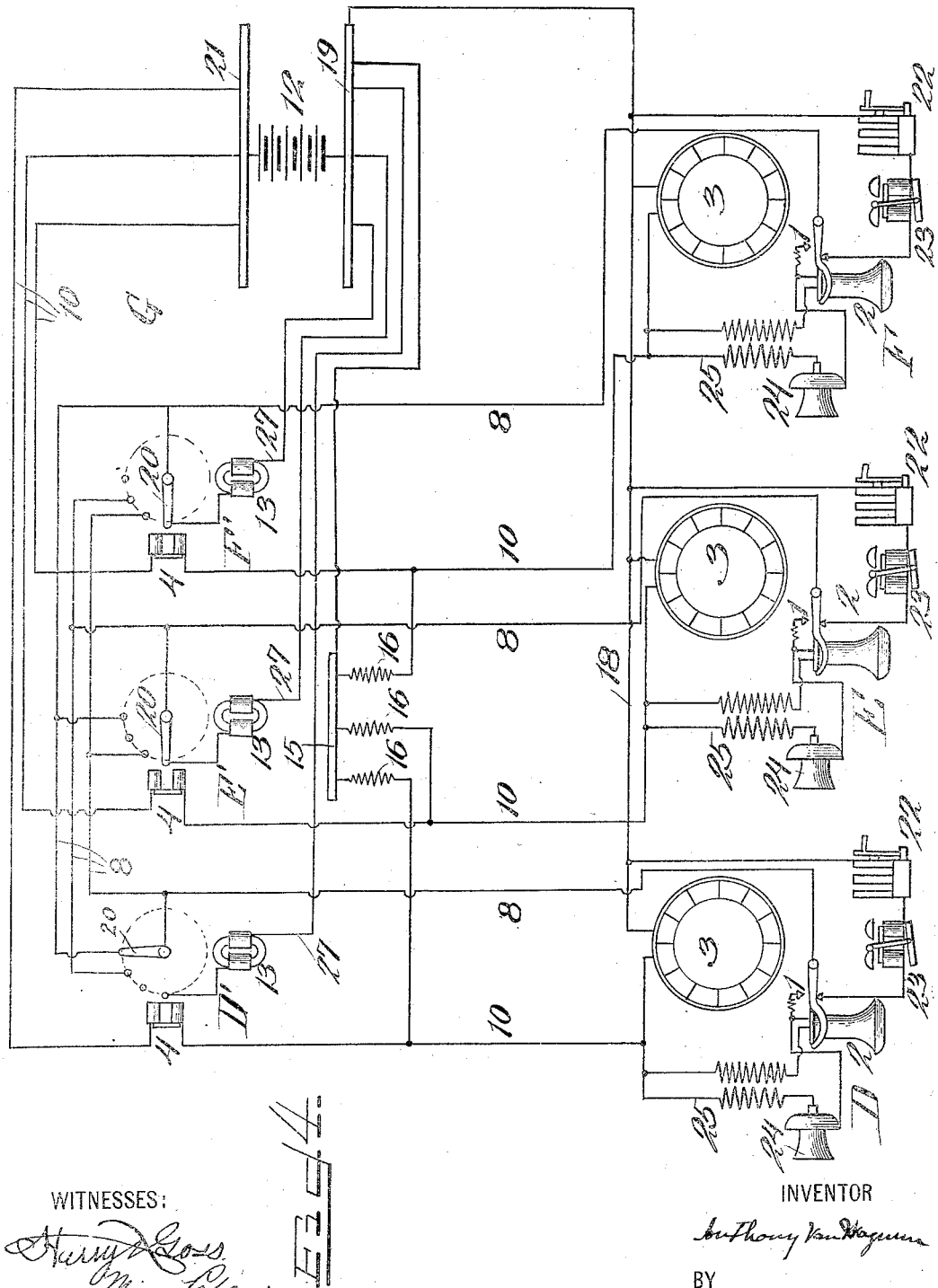
WITNESSES:
INVENTOR
BY
ATTORNEYS No. 833,429. PATENTED OCT. 16, 1906.
A. VAN WAGENEN.
AUTOMATIC SYSTEM OF INTERCOMMUNICATION.
APPLICATION FILED JULY 31, 1902. RENEWED MAR. 3, 1906.
8 SHEETS—SHEET 5.
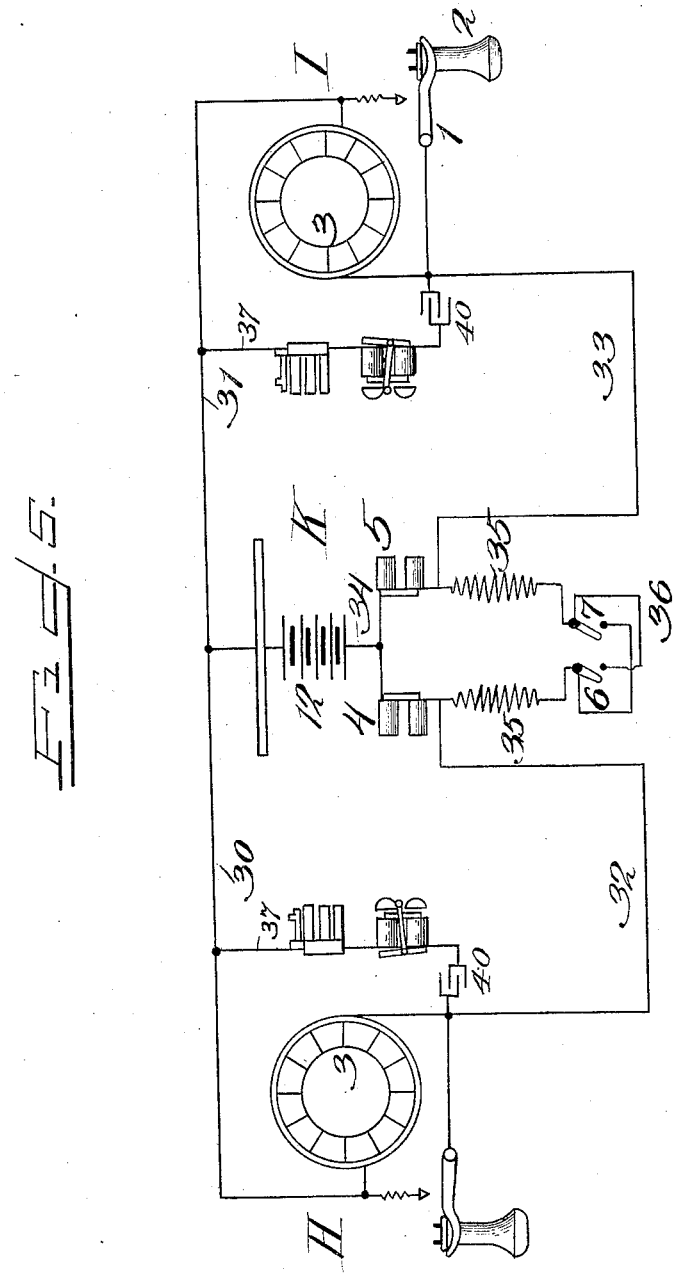
WITNESSES:
INVENTOR
BY
ATTORNEYS

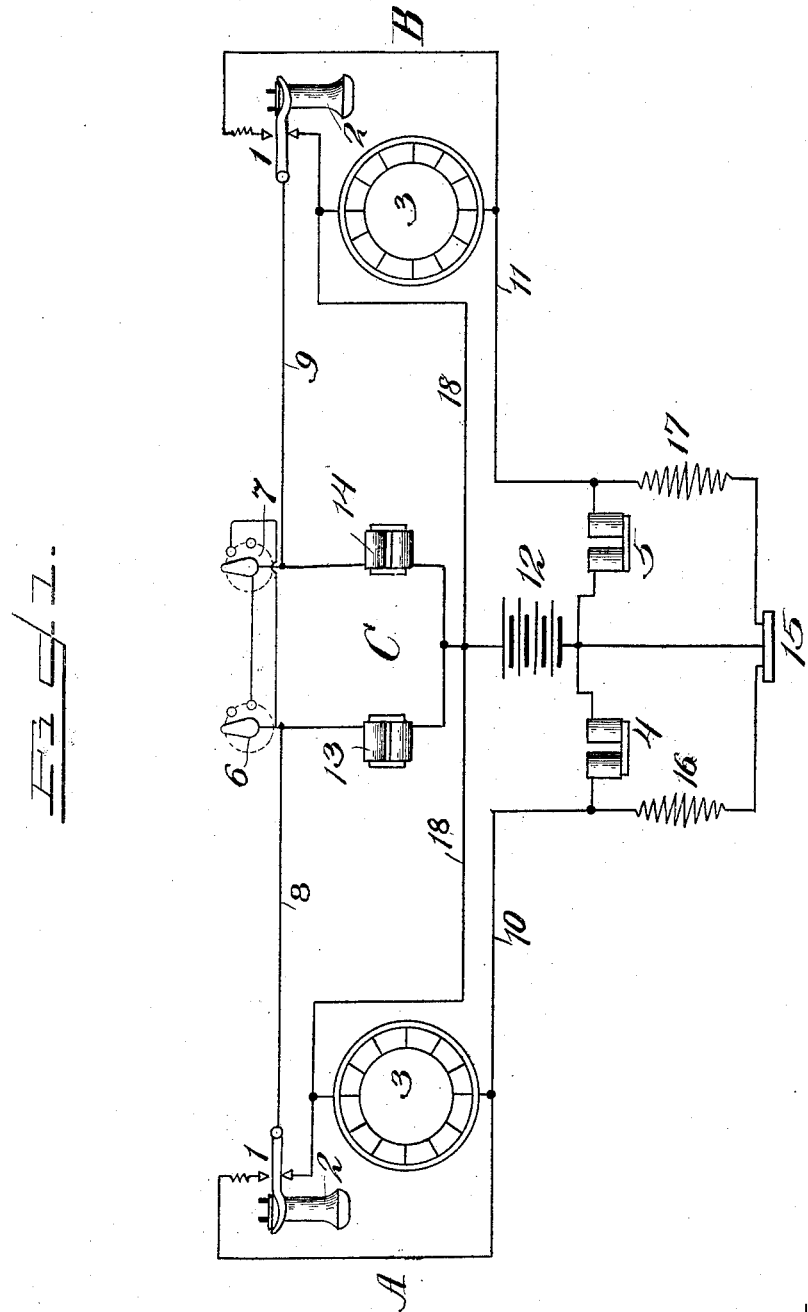

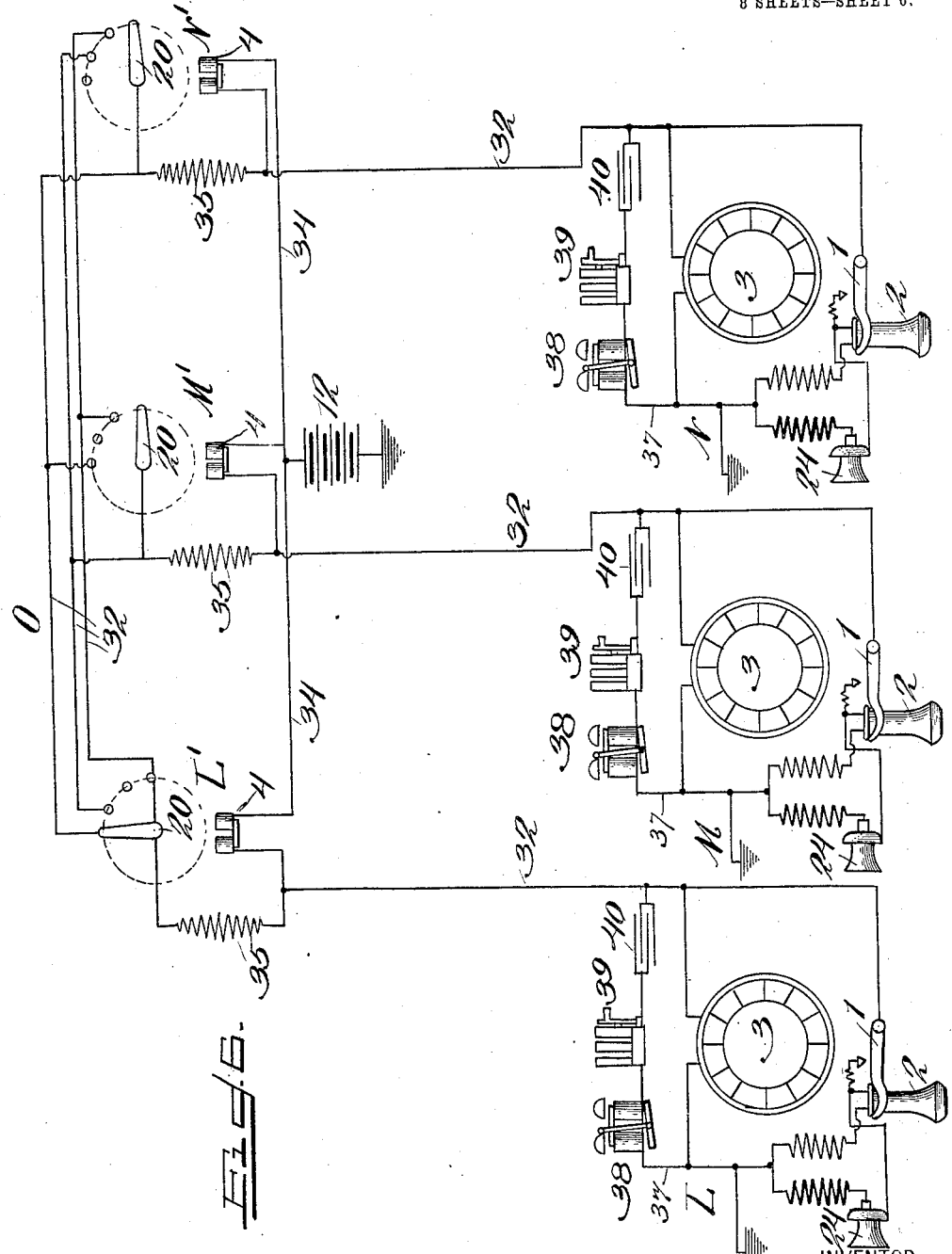

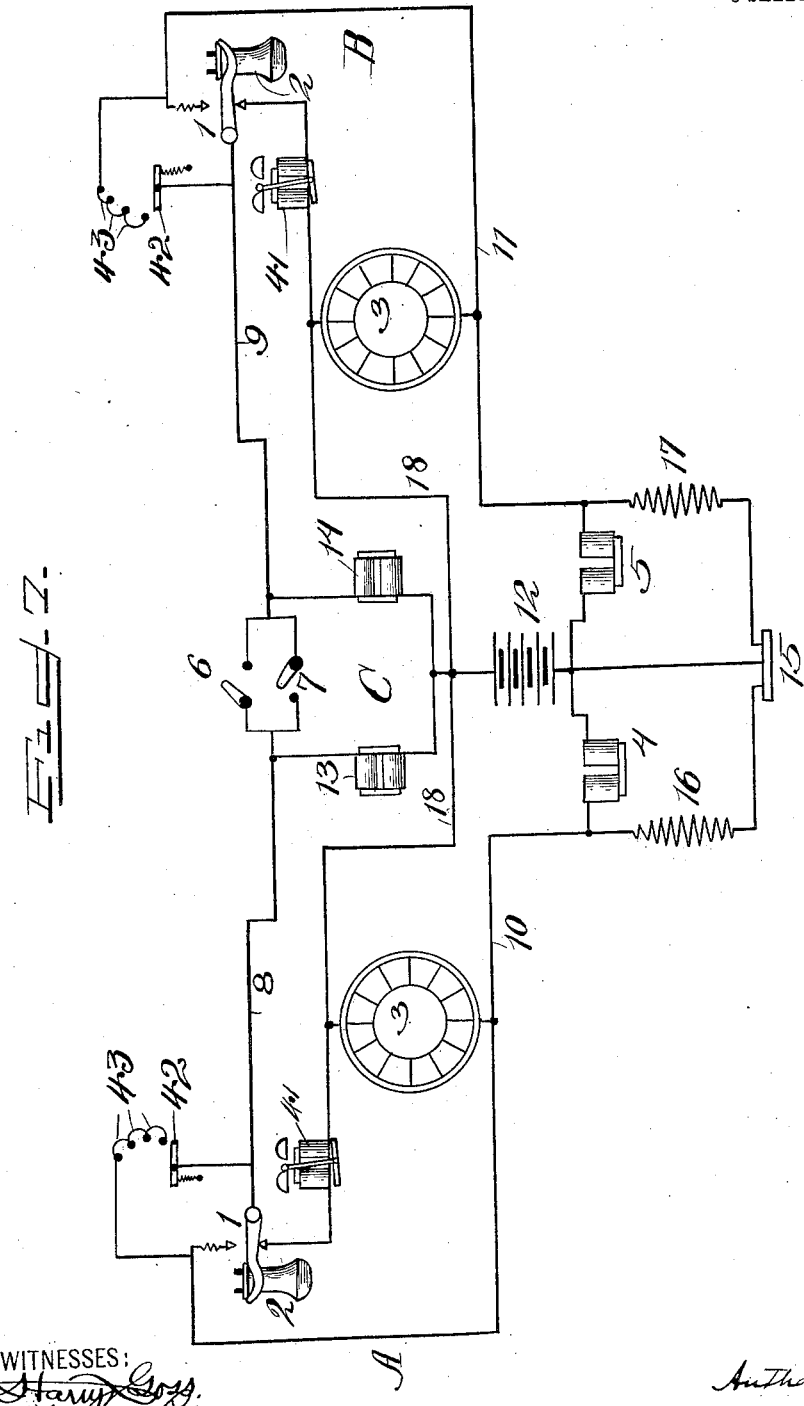

No. 833,429. PATENTED OCT. 16, 1906.
A. VAN WAGENEN.
AUTOMATIC SYSTEM OF INTERCOMMUNICATION.
APPLICATION FILED JULY 31, 1902. RENEWED MAR. 3, 1906.
8 SHEETS—SHEET 8.
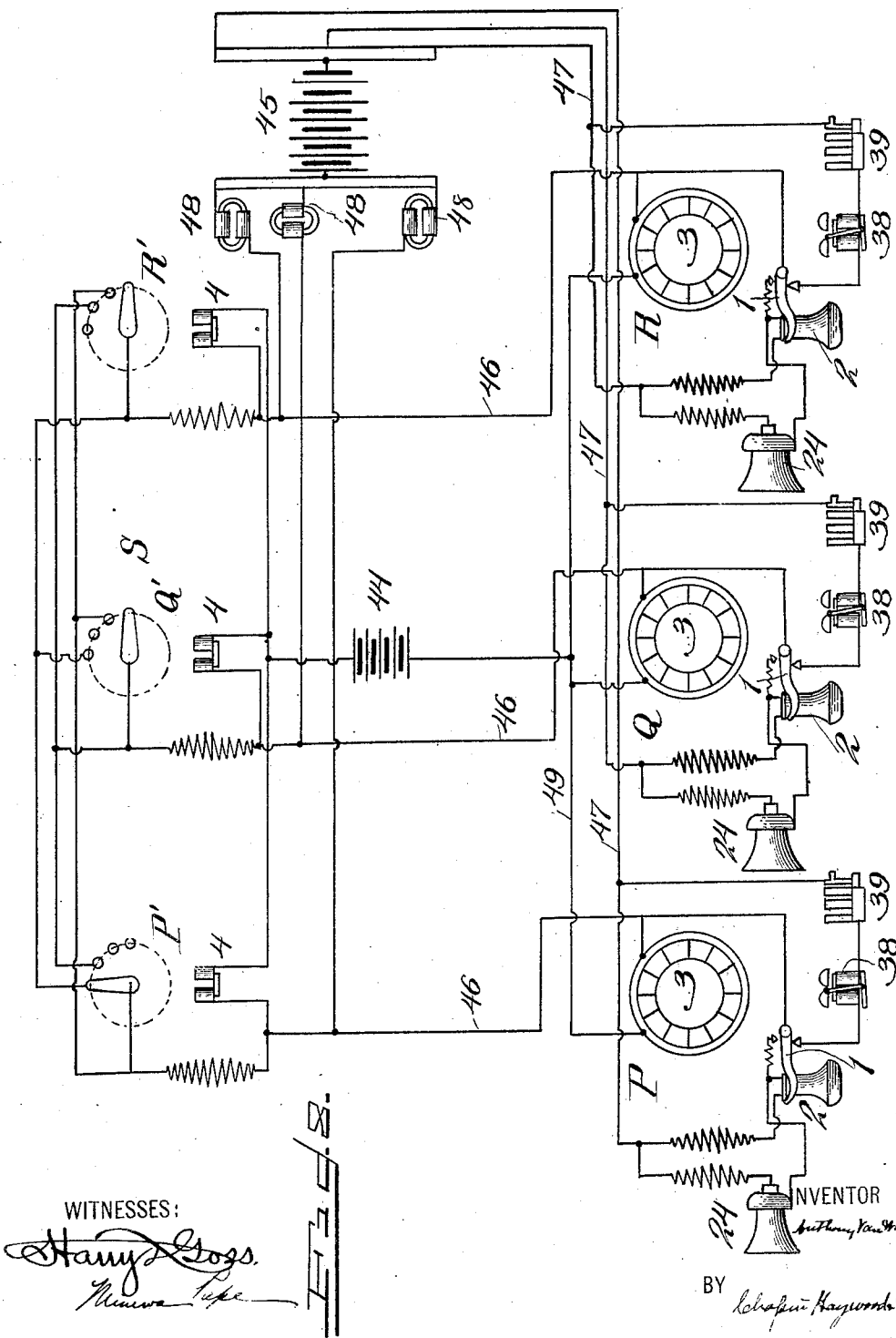
WITNESSES:
INVENTOR
BY
ATTORNEYS.

UNITED STATES PATENT OFFICE.

ANTHONY VAN WAGENEN, OF SIOUX CITY, IOWA.

AUTOMATIC SYSTEM OF INTERCOMMUNICATION.

No. 833,429. Specification of Letters Patent. Patented Oct. 16, 1906.

Application filed July 31, 1902. Renewed March 3, 1906. Serial No. 304,050.

*To all whom it may concern:*

Be it known that I, ANTHONY VAN WAGENEN, a citizen of the United States, residing at Sioux City, in the county of Woodbury and State of Iowa, have invented certain new and useful Improvements in Automatic Systems of Intercommunication; and I do hereby declare the following to be a full, clear, and exact description of the invention, such as will enable others skilled in the art to which it appertains to make and use the same.

My invention relates to improvements in automatic systems of intercommunication, such as involve the use of a plurality of separate instruments of communication with electric circuits therefor leading to a central station and automatic central-station switches by which different instruments of communication may be placed in operative connection at will.

My invention consists in novel means of supplying current both for the several instruments of communication of the system and for the switching instruments and circuits from a single battery or other source of electric current and in many other features, as hereinafter pointed out in the claims.

My invention is particularly intended for use in automatic telephone systems and in the following description will be described in its application to an automatic telephone system; but it will be obvious that the invention is likewise adaptable for other systems of intercommunication—such, for example, as telegraph systems, fire-alarm systems, hotel signaling systems, and the like. In these various systems of intercommunication the instruments which are intended to be directly operated by the persons who desire to communicate with each other (such, for example, in automatic telephone systems, as the telephone instruments themselves and the calling instruments by which the central-station switches are operated) are commonly called "subscribers'" instruments and will be so called herein, although it will be understood that by so doing I do not limit the use of the herein-described system in any way.

The objects of my invention are to supply current for operating both the subscribers' instruments of communication (such as telephone instruments) and the central-station switches from a single battery or other source of electric current with a minimum number of wires and a minimum number of contacts, to secure perfect secrecy, and to make the system as simple, economical, and free from liability to derangement as possible.

I will now proceed to describe my system with reference to the accompanying drawings, in which the application of my invention to an automatic telephone system such as that covered by the patent to Clark, Ellacott, and Johnson, No. 582,578, dated May 11, 1897, is illustrated and will then point out the novel features in claims.

In the said drawings, Figure 1 shows diagrammatically the application of my invention in a simple form to a system consisting of two subscribers' stations only. Fig. 2 shows diagrammatically the application of my invention to a system comprising three subscribers' stations, the wiring at the subscribers' stations and at the central station being illustrated in greater detail. Fig. 3 illustrates an alternative arrangement of circuits similar to that of Fig. 2, but in which central-station switches having a double row of contact-points were employed. Fig. 4 is a similar diagrammatic view illustrating a further alternative arrangement of circuits. Fig. 5 is a view similar to Fig. 1, illustrating an alternative arrangement in which the switch-magnets supply the inductive resistance necessary for the operation of the system. Fig. 6 is a view illustrating the application of the arrangement of Fig. 5 to a system of three stations, a grounded circuit being shown. Fig. 7 shows how the call-bells may be operated from the central-station battery. Fig. 8 shows the use of two central-station batteries, one of which supplies the current for operating the central-station switches, the other for the operation of the telephone instruments.

Referring first to Fig. 1, the subscribers' stations of that figure are designated by reference-letters A and B and the central station by C. The drawing shows the ordinary receiver-hook switches 1 1 and telephone-receivers 2 2, the telephone-transmitters and the wiring for the receivers and transmitters being omitted. 3 3 are the calling-transmitters, by the operation of which the central-station switches are operated. I do not limit myself to the use of any particular calling-transmitter, but may use that shown in Patent No. 588,511, granted to me August 17, 1897. Such calling-transmitters usually comprise a dial and suitable contact mechanism, so that when the dial or a pointer arranged in connection therewith is set to any particular number or space, the circuit controlled by said calling-transmitter is completed and broken a number of times corresponding to the particular position to which the dial or its pointer has been set, thereby operating the central-station switch a corresponding number of times. At the central station the numerals 4 and 5 designate the operating-magnets of the central-station switches corresponding to stations A and B, respectively. The construction of the central-station switches is not indicated; but I may use the switch shown in the patent to Clark, Ellacott, and Johnson above mentioned or the switch shown in my Patent No. 702,684, dated June 17, 1902. The switch-contacts which are closed by the operation of these switches are represented diagrammatically at 6 and 7. These contacts are arranged to connect telephone or service lines 8 and 9, leading from the central station to stations A and B, respectively. Other conductors 10 and 11 likewise connect stations A and B with the central station, and a common battery 12 or other suitable source of electric energy for supplying current to the system and located, preferably, at the central station is connected on one side to telephone-wires 8 and 9 through inductive resistances (commonly termed "retardation-coils") 13 and 14, and is also connected to a return-wire 18, usually a common return, the other side of the battery being connected to wires 10 and 11 (commonly termed "switch-wires") through switch-magnets 4 and 5. The coils of these magnets necessarily have considerable self-induction, and hence act as retardation-coils. Wires 10 and 11 are likewise permanently connected to a bus-bar 15 through non-inductive resistances 16 and 17, and hence are in permanent connection with each other. One side of each calling-transmitter 3 is connected to the central-station battery through the corresponding switch-wire 10 or 11. The other side of each calling-transmitter is connected to the opposite pole of battery 12 through wire 18, commonly termed the "common-return" wire, since, as hereinafter shown, this wire may serve as the return-wire of the calling-transmitters of a number of stations. It does not form a part of the telephonic circuit in the particular arrangement of circuits shown in Fig. 1, being used only during the operation of the central-station switches and of the call-bells.

The telephone-wires, switch-wires, and common-return wires are all connected to the receiver-hook switches at the subscribers' stations, the mechanism of the switches being such that the telephone-wire connected to any particular switch is in circuit with the common-return wire or with the corresponding switch-wire, according as the receiver-hook is depressed or elevated. Normally a circuit is complete (except in so far as it may be interrupted by contacts within the calling-transmitter) from one pole of battery 12 through the switch-wire and common-return wire of each subscriber's station to the opposite pole of the battery. Each subscriber's calling-transmitter 3 is therefore in condition for operation at all times, and when one of them is operated it closes the contact (6 or 7, as the case may be) of the corresponding central-station switch, thereby placing the telephone-wires 8 and 9 in communication. Subscribers' stations A and B are then connected by a circuit consisting of wires 8 and 9 and common-return wires 18. There is no battery in this circuit; but said circuit serves nevertheless for the operation of call-bells or other signaling devices not shown in Fig. 1, but shown in subsequent figures. As soon as the telephone-receivers are lifted from their hooks the stations A and B are connected by a circuit comprising telephone-conductors 8 and 9, switch-conductors 10 and 11, non-inductive resistances 16 and 17, and bus-bar 15. There is no battery in this circuit either; but since battery 12 is bridged across this circuit at the central station there is a battery-circuit for each subscriber's station, the current of which battery serves for the operation of the subscriber's telephone instruments, and while the battery-current does not pass from station A to station B, but only from the central station to both station A and station B, nevertheless telephonic current fluctuations produced in conductors 8 and 10, for example, by the operation of the telephone instruments at station A will pass through the switch-contact at the central station and through the non-inductive resistances 16 and 17 and bus-bar 15 to wires 9 and 11 of station B, and so to the telephone instruments of that station. These telephonic fluctuations, as is well known, pass through the longer circuit comprising conductors 8 and 10 and 9 and 11, which circuit, although perhaps of relatively high ohmic resistance, has low inductive resistance, since the shorter circuit comprising the battery-bridge, although it may be of relatively lower ohmic resistance, has relatively higher inductive resistance by reason of the inclusion in it of a retardation-coil and switch-magnet.

It will be noted, therefore, that the system comprises for each station talking and switching circuits which are in part common, means for placing the subscribers' stations in electrical connection, and a central-station battery, which, although bridged across the telephone-circuit and therefore incapable of causing battery-current to pass from one subscribers' station to another, nevertheless supplies current both for the operation of the telephone instruments of each station and of the central-station switching instrument for each station.

Fig. 2 shows in greater detail how a plurality of subscribers' stations may be connected with a central station and through the instrumentality of central-station switches may be connected to each other according to my system. The said figure shows three subscribers' stations, (lettered D E F, respectively) and a central station G, having automatic central-station switches corresponding each to one of the subscribers' stations and lettered D', E', and F', respectively. The several receiver-hook switches of this figure are all numbered 1, the telephone-receivers are all numbered 2, the calling-transmitters are all numbered 3, the telephone-wires are all numbered 8, the switch-wires are all numbered 10, and the retardation-coils are all numbered 13. 12 designates the battery for supplying current to the system, 15 the central-station bus-bar, 16 the non-inductive resistances in circuit with this bus-bar, and 18 designates the common return-conductor connected to bus-bar 19, forming one terminal of battery 12, to which bus-bar the retardation-coils 13 are likewise connected. In this figure the automatic central-station switches are represented conventionally by the conventional representation of a magnet 4, having adjacent thereto a contact-arm 20 in proximity to a series of contact-points arranged in circular series. The spaces in this series corresponding to the normal position of the contact-arm and to the particular subscriber's station to which each particular switch belongs are customarily left blank. The telephone-wire 8 of each subscriber's station is connected to the contact-arm 20 of the corresponding switch and is further connected to one of the contact-points of each of the other central-station switches of the system. The contact-arm 20 of switch D' is shown in the position to connect subscribers' stations D and F, the contact-arms of the other central-station switches being shown in their normal positions. With the switch-arm of D' in the position shown a telephonic circuit connecting stations D and F may be traced as follows: from the receiver-hook switch 1 of station D through telephone-wire 8 of that station to contact-arm 20 of central-station switch D', thence through the telephone-wire 8 of station F to the receiver-hook switch 1 of that station, and thence through the telephone receiver and transmitter (supposing, of course, that the receiver-hook is up) through the switch-wire 10 of station F to bus-bar 15, and thence through the switch-wire 10 of station D and the telephone transmitter and receiver of that station and through the receiver-hook switch 1 of station D (supposing, of course, that that receiver-hook is up) back to the starting-point. Battery 12 is bridged across this telephonic circuit, the same as in Fig. 1, since its bus-bar 19 is connected through the retardation-coils to each of the telephone-wires 8, and the opposite terminal of said battery is connected by another bus-bar 21 with each of the switch-wires 10. The circuits therefore correspond precisely to those shown in Fig. 1. When one of the subscribers—as, for example, that of station D—wishes to place himself in communication with any of the other subscribers—as, for example, that at station F—he operates his calling-transmitter 3 (the receiver-hook switches being down, as shown in the drawings) by setting his dial for station F, and this causes the calling-transmitter to send through the switch-circuit of station D (comprising switch-wire 10 of that station, the magnet 4 of central-station switch D', battery 12, and return conductor 18) a number of current impulses sufficient to move the switch-arm 20 into contact with the terminal of that switch to which the telephone-wire 8 of station F is connected, (this being the position of contact-arm 20 of switch D' shown in the drawings.) Upon the conclusion of a conversation the subscriber at station D returns the dial of his calling-transmitter 3 to normal, and thereby the contact-arm 20 of the corresponding central-station switch is likewise returned to normal. In Fig. 2 I have shown an ordinary magneto-generator 22 and corresponding call-bell 23 at each subscriber's station in a local circuit extending from the lower contact-point of the receiver-hook switch to the common-return line 18. The alternating-current impulses produced by these magneto-generators pass through the telephonic circuit when the latter is established, for the reason that the full telephonic circuit has less inductive resistance than the circuit formed by the central-station bridge, in which bridge inductive resistance is interposed.

In Fig. 2 telephone-transmitters 24 are shown at the subscribers' stations as well as telephone-receivers. The circuits of the telephone-receivers and transmitters include induction-coils 25, as is ordinarily the case.

The circuits shown in Fig. 3 are similar to those of Fig. 2, except that each central-station switch employed has two contact-arms, one of which is numbered 20, as in Fig. 2, the other being numbered 26, each central-station switch having a second row of contact-pieces corresponding to this second contact-arm. The several switch-wires are arranged and connected the same as in Fig. 2, and the several telephone-wires 8 are likewise connected, as in Fig. 2, to their respective switch-arms 20, and thence to a contact-point of each of other central-station switches; but instead of employing a bus-bar, as 15, to which a branch of each of the switch-wires 10 of the system is connected, each such switch-wire is connected through a non-inductive resistance 16 to the switch-arm 26 of its own switch and to one of the second row of contact-pieces of each of the other switches. The result of this arrangement is that both sides of the telephone-circuits pass through the central-station switches, and the talking-circuit established between any two stations is entirely distinct from that of any other stations, except for the battery connections.

The operation of the circuits and instruments shown in Fig. 3 is the same as that shown in Fig. 2, and hence requires no special description.

The arrangement of circuits and instruments shown in Fig. 4 is similar to that shown in Fig. 2, except that the retardation-coils are not interposed directly between battery bus-bar 19 and their several telephone-wires, but are each in a local circuit 27, connecting the battery bus-bar 19 with the "normal" contact-point of the central-station switch to which each particular retardation-coil belongs. When two stations—as, for example, station D and station F—are in communication, therefore, the telephonic circuit is from the receiver-hook switch of station D through telephone-wire 8 of that station and through central-station switch D' to the telephone-wire 8 of station F, thence through receiver-hook switch of station F (said hook being up) and the telephone receiver and transmitter of that station and switch-wire 10 of station F to bus-bar 15, and thence through switch-wire 10 of station D and the telephone transmitter and receiver of that station back to the receiver-hook switch.
Battery 12 is bridged across this circuit by wires (continuations of the switch-wires 10) leading from the positive pole of battery 12 to the point of connection of such wires with the branches thereof connected to bus-bar 15 and by a wire 27 leading from the negative pole of battery 12 through a retardation-coil 13 to switch F', and thence to telephone-wire 8 of station F, which wire, as already stated, forms a part of the telephonic circuit.
It will be seen that with this arrangement only one retardation-coil is used.

It is obvious that one or more of the lines connecting each subscriber's station with the central station may include ground. In particular the common-return line may be formed by grounded connections.

Referring to Fig. 1, it will be noted that if the magnets of the automatic central-station switches are not of high-inductive resistance they themselves afford a path for the telephonic fluctuations which is the equivalent of the path formed by non-inductive resistances 16 and 17 and bus-bar 15. In practice if the resistance of the switch-magnets is more than ten ohms I prefer to use the shunt connection containing the non-inductive resistances and bus-bar, as shown in Fig. 1.

The switch-magnets may themselves be caused to constitute the inductive resistances necessary in the bridge-circuit for the operation of the system, no other inductive resistance being required. This is illustrated in Fig. 5, which is a figure similar to Fig. 1, showing two subscribers' stations H and I and a central station K. The receiver-hook switches, telephone-receivers, and calling-transmitters are designated by the same reference-numerals as in Fig. 1, as are the switch-magnets and the switch-contacts and the central-station battery. Return-lines (here numbered 30 and 31) extend from the upper contact-points of their respective receiver-hook switches to the bus-bar of the central-station battery, and the service-conductors (here numbered 32 and 33) extend from the receiver-hooks to their respective switch-magnets 4 and 5, respectively, from which a bridge connection 34 leads to the opposite pole of the battery. Between each switch-magnet and the movable contact-arm of the switch a non-inductive resistance 35 is interposed. Conductors 36 connect the contact-arm of each switch with a contact-point of the other switch, with which the contact-arm thereof is adapted to make contact. The calling-transmitters 3 are connected to their respective telephone and switch wires. When one of these calling-transmitters is operated, it alternately completes and breaks the battery-circuit comprising its telephone and switching conductors and the switch-magnet, thus moving the contact-arm of the corresponding central-station switch into contact with a contact-point corresponding to the station called. The non-inductive resistances 35 prevent each calling-transmitter from operating any central-station switch except that one to which it corresponds. Other non-inductive resistances interposed between the calling-transmitters and the receiver-hook switches in the talking-circuits insure that the raising of a receiver-hook switch and the consequent completion of a battery-circuit through its transmitter and receiver shall not operate the corresponding central-station switch. These resistances likewise serve to reduce the battery-current to the strength best adapted for the telephone instruments. Supposing that the calling-transmitter at station H be operated, a telephonic circuit is thereby completed from station H through conductor 32 to the central station, thence through non-inductive resistance 35 of the corresponding central-station switch, and through the switch connection 6 and conductor 36 to the non-inductive resistance of the switch corresponding to station I, and thence through conductor 33, the receiver-hook switch at station I, conductors 31 and 30, and the receiver-hook switch at station II back to the starting-point. As in the preceding figures, it will be seen that the battery is bridged across the telephonic circuit, the self-induction of the coils of magnets 4 and 5 causing the telephonic fluctuations to pass from one station to another in preference to passing through the bridge-circuit. It is obvious that in this arrangement if a number of subscribers' stations are located on one side of the central station a single return-wire common to all of these stations may lead to battery or that a ground connection may be employed. The call-bells and magneto-generators therefor may be located in shunt-circuits 37, connecting the two sides of each subscriber's circuit, condensers 40 or other suitable means being employed to prevent wasteful flow of battery-current through these shunt connections.

In Fig. 6 I show the same arrangement of circuits and apparatus applied to a system comprising three central-station switches, the return connections being through ground, however. The three subscribers' stations are lettered L, M, and N, and the central station is lettered O. The telephone transmitters, receivers, receiver-hook switches, and calling-transmitters and the switch-magnets and contact-arms are numbered as in the preceding figures, as is the central-station battery. The service-wires leading from the subscribers' stations to the central station are numbered 32. Each such wire is connected through non-inductive resistance 35 to the contact-arm of its switch, and thence to a contact-point of each of the other switches. It is also connected by a bridge-conductor 34 to its switch-magnet, and thence to one pole of the battery 12. The other pole of this battery is connected to ground. The telephone-receivers and transmitters are connected on one side to the upper contact of the receiver-hook switch (there being no lower contact) and on the other side are connected to ground. The bells 38 and generators 39 are in shunt-circuits leading from conductors 32 to ground, which circuits include condensers 40. It will be seen that this arrangement of circuits and instruments provides for communication between any of the stations of the system, and for the operation of the central-station switches as well, all from the central-station battery, and that nevertheless only one independent wire is required from each subscriber's station to the central station, the return being either through ground or through a common-return conductor, as preferred. The simplicity of this system will be appreciated.

In another application for Letters Patent filed July 31, 1902, Serial No. 117,813, I have claimed specifically the systems shown in Figs. 5 and 6, in which a single circuit for each subscriber serves both for talking and for the operation of the central-station switches.

Instead of using magneto-generators for ringing the call-bells, bells operated by battery-current may be used. This is illustrated in Fig. 7, which is a view similar to Fig. 1, except that battery-operated call-bells 41 are connected to the common-return conductor 18 and that a ringing-switch of a simple form, consisting, essentially, of a contact-arm 42, adapted to make contact successively with a series of connected contact-studs 43, is shown interposed at each subscriber's station between the switching-wire 11 and the telephone-wire 8 or 9. The bells employed may be vibrating bells or may be biased, being arranged to move clappers in one direction when the battery-current is completed through them and to move them back as soon as the battery-current is discontinued. The operation of this arrangement is as follows: Supposing that the subscriber at station B has called the subscriber at station A, and so has completed communication between service-lines 8 and 9 through contact 7 of one of the central-station switches. When the subscriber at station B removes his receiver from its hook a circuit is complete from battery 12 through conductor 11 and the receiver-hook switch at station B and through conductors 9 and 8, the magnet of the call-bell at station A, (the receiver-hook at that station being still down, of course,) and through the common-return conductor back to battery. The bells being biased, as above stated, at the completion of this circuit the bell at station A will give a short ring. The subscriber at station B may ring the bell at station A repeatedly by raising and lowering his receiver-hook switch or by operating his ringing-switch, the contact-arm 42 of which completes the same ringing-circuit as the receiver-hook switch. As soon as the subscriber at station A responds and lifts his receiver from its hook or operates his ringing-switch, the conditions are reversed, and if B has replaced his receiver on its hook, his bell is rung, thus notifying B that the call has been answered. For the bells other signaling devices may be substituted.

It is obvious that my invention is susceptible to many variations and modifications in location and arrangement of the circuits and instruments, and I do not confine myself to the particular constructions herein shown and described.

Instead of employing a single central-station battery for supplying current both for talking and for operating the central-station switches separate batteries may be employed. This is illustrated in Fig. 8, which shows three subscribers' stations P Q R, a central station S, central-station switches P' Q' R', and two central-station batteries 44 and 45. Service-wires 46 connect each subscriber's station with the central station, where they divide, as in Fig. 6, one branch passing through the corresponding central-station switch-magnet and thence to battery 44, the other branch passing through non-inductive resistance to the contact-arm of its central-station switch. Other service-wires 47 connect each subscriber's telephone instruments with the bus-bar of the central-station battery 45. The opposite pole of battery 45 is connected to the several wires 46 through inductive resistances 48. One side of each calling-transmitter 3 is connected to the corresponding service-wire 46, the opposite side to a return-conductor 49, which may be a common-return conductor. For the common-return conductor ground connections may of course be substituted. The talking-circuit established by this system is as follows: Supposing stations P and R to be in connection, as shown in the drawings, the circuit is from the receiver-hook of station P through conductor 46 of that station, central-station switch P', and the central-station connections to the wire 46 of station R, thence through the telephone instruments of that station (the receiver-hook being up) and through the wire 47 of station R to the bus-bar of battery 45, and thence through wire 47 of station P and the telephone instruments of that station back to the starting-point. The battery 45 is bridged across this circuit through the wires including the inductive resistances 48, and because of the fact that all the wires 47 are connected to one pole of the battery. This system, involving the use of the two batteries, forms the subject-matter of a divisional application for letters Patent, filed January 21, 1904, Serial No. 189,976.

Having now fully described my invention, what I claim is—

1. In an automatic telephone system, the combination with a central station, a plurality of subscribers' stations, a service and a switching wire connecting each subscriber's station with the central station, the latter conductor having return connections independent of the service-wire, the service and switching wires of each station constituting a talking-circuit therefor, and the switching-wire of each station and the return connections therefor constituting a switching-circuit, and means at the central station for operatively connecting the talking-circuits of the different subscribers, comprising automatic switches each having electrically-operated contact mechanism including an operating-magnet permanently included in the corresponding switching-circuit, of means at the central station for supplying electric current, connected to the several talking-circuits in common and to the several switching-circuits in common, and telephone instruments and means for operating said central-station switches, at the several subscribers' stations.

2. In an automatic telephone system, the combination with a central station, a plurality of subscribers' stations, a service and a switching wire connecting each subscriber's station with the central station, the latter conductor having return connections independent of the service-wire, the service and switching wires of each station constituting a talking-circuit therefor, and the switching-wire of each station and the return connections therefor constituting a switching-circuit, and means at the central station for operatively connecting the talking-circuits of the different subscribers, comprising automatic switches each having electrically-operated contact mechanism including an operating-magnet permanently included in the corresponding switching-circuit, of means at the central station for supplying electric current for talking and switching, comprising a source of electrical energy bridged across talking-circuits which are connected by said central-station switches, and telephone instruments and means for operating said central-station switches, at the several subscribers' stations.

3. In an automatic telephone system, the combination with a central station, a plurality of subscribers' stations, a service and a switching wire connecting each subscriber's station with the central station, the latter conductor having return connections independent of the service-wire, the service and switching wires of each station constituting a talking-circuit therefor, and the switching-wire of each station and the return connections therefor constituting a switching-circuit, and means at the central station for operatively connecting the talking-circuits of the different subscribers, comprising automatic switches each having electrically-operated contact mechanism including an operating-magnet permanently included in the corresponding switching-circuit, of a common source of electrical energy for talking and switching, included in both the talking and switching circuits of each subscriber, and telephone instruments and means for operating said central-station switches, at the several subscribers' stations.

4. In an automatic telephone system, the combination with a central station, a plurality of subscribers' stations, a service and a switching wire connecting each subscriber's station with the central station, a source of electrical energy at the central station, bridged across the several subscribers' service and switching lines, means at the central station for connecting wires of the different subscribers comprising automatic switches each having electrically-operated contact mechanism including an operating-magnet permanently included in the corresponding bridge circuit, and return connections for the switching-wires, forming therewith switching-circuits in which the common source of electrical energy and the corresponding switch-magnets are included, of telephone instruments and means for operating said central-station switches, at the several subscribers' stations.

5. In an automatic telephone system, the combination with a central station, a plurality of subscribers' stations, subscribers' circuits connecting said subscribers' stations and the central station, and means at the central station for connecting subscribers' circuits comprising automatic switches each having electrically-operated contact mechanism including an operating-magnet permanently bridged across a corresponding subscriber's circuit, of a common source of electrical energy included in common in the bridge connections of said magnets, resistance interposed between the switch-magnet of each subscriber and the switch-magnets of the other subscribers, and telephone instruments and means for operating said central-station switches, at the several subscribers' stations.

6. In an automatic telephone system, the combination with a central station, a plurality of subscribers' stations, service, switching and return wires connecting each subscriber's station with the central station, and means at the central station for connecting operatively the subscribers' talking-circuits, comprising automatic switches each having electrically-operated contact mechanism including an operating-magnet included in a switching-circuit comprising the corresponding subscriber's switching-wire and the return-wire, of central-energy means for supplying current to said circuits for switching and for conversation, comprising a battery bridged across the service and switching wires of the several subscribers, telephone instruments at the subscribers' stations in talking-circuits comprising the said service and switching wires, and means at the subscribers' stations, for operating the central-station switches, included in the said switching-circuits.

7. In an automatic telephone system, the combination with a central station, a plurality of subscribers' stations, service, switching and return wires connecting each subscriber's station with the central station, and means at the central station for connecting operatively the subscribers' talking-circuits, comprising automatic switches each having electrically-operated contact mechanism including an operating-magnet included in a corresponding switching-circuit comprising the corresponding subscriber's switching-wire and the return-wire, of central-energy means for supplying current to said circuits for switching and for conversation, comprising a battery bridged across the service and switching wires of the several subscribers, telephone intruments at the subscribers' stations, signaling means at the subscribers' stations, switches arranged to form talking-circuits through said telephone instruments and the talking and switching wires, or signaling-circuits through the switching and return wires, and means at the subscribers' stations for operating the central-station switches.

8. In an automatic telephone system, the combination with a central station, a plurality of subscribers' stations, a service and a switching wire connecting each subscriber's station with the central station, the latter conductor having return connections independent of the service-wire, the service and switching wires of each station constituting a talking-circuit therefor, and means at the central station for connecting the talking-circuits of the different subscribers, comprising automatic switches each having contact mechanism comprising contacts for connecting the several service-wires and other contacts for connecting the several switching-wires and an operating-magnet included in the switching-circuit comprising the corresponding subscriber's switching-wire and the return connections thereof, of means at the central station for supplying electric current, connected to the several talking-circuits in common and to the several switching-circuits in common, and means for operating said central switches, at the several subscribers' stations.

9. In an automatic telephone system, combination with the central station, a plurality of subscribers' stations, subscribers' circuits connecting said subscribers' stations and the central-station, for conversation and for operating central-station switches, and means at the central station for connecting subscribers' talking-circuits comprising automatic switches each having electrically-operated contact mechanism comprising contacts for both sides of said talking-circuits and an operating-magnet permanently bridged across a corresponding subscriber's circuit, of central-energy means for supplying electric current for talking and switching comprising a common source of electrical energy included in common in the bridge connections of said magnets, and telephone instruments and means for operating said central-station switches, at the several subscribers' stations.

In testimony whereof I affix my signature in the presence of two witnesses.

ANTHONY VAN WAGENEN.

Witnesses:
CAL BRADSTREET,
EDWIN J. STASON.